United States Patent
Li et al.

(10) Patent No.: US 9,319,301 B2
(45) Date of Patent: Apr. 19, 2016

(54) METHOD AND NODE FOR REALIZING ROUTE DISCOVERY IN NETWORK

(75) Inventors: Cheng Li, Beijing (CN); Jun Tian, Beijing (CN); Chao Lv, Beijing (CN); Hao Wang, Beijing (CN); Yuuta Nakaya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 271 days.

(21) Appl. No.: 13/237,017

(22) Filed: Sep. 20, 2011

(65) Prior Publication Data

US 2012/0076005 A1 Mar. 29, 2012

(30) Foreign Application Priority Data

Sep. 20, 2010 (CN) .......................... 2010 1 0290852

(51) Int. Cl.
*H04L 12/26* (2006.01)
*H04L 12/721* (2013.01)
*H04W 28/06* (2009.01)
*H04W 84/18* (2009.01)

(52) U.S. Cl.
CPC .............. *H04L 45/123* (2013.01); *H04W 28/06* (2013.01); *H04W 84/18* (2013.01)

(58) Field of Classification Search
CPC ..... H04W 40/02; H04L 45/123; H04L 45/22; H04L 45/12; H04L 45/122
USPC .................. 370/229–231, 312, 315, 238, 248
See application file for complete search history.

(56) References Cited

U.S. PATENT DOCUMENTS

| | | | |
|---|---|---|---|
| 7,272,116 B1* | 9/2007 | Houchen | 370/258 |
| 7,729,260 B2* | 6/2010 | Larsson et al. | 370/238 |
| 2004/0160941 A1* | 8/2004 | Suh et al. | 370/349 |
| 2005/0111428 A1* | 5/2005 | Orlik et al. | 370/344 |
| 2008/0025242 A1* | 1/2008 | Nagata et al. | 370/312 |
| 2008/0186864 A1* | 8/2008 | Ho | 370/238 |
| 2010/0195560 A1* | 8/2010 | Nozaki et al. | 370/315 |

FOREIGN PATENT DOCUMENTS

| | | |
|---|---|---|
| CN | 101686521 | 3/2010 |
| JP | 2006-287538 | 10/2006 |
| JP | 2008-135914 | 6/2008 |
| WO | 2010/013154 A1 | 2/2010 |

OTHER PUBLICATIONS

Chinese Office Action mailed Dec. 9, 2013 in corresponding Chinese Patent Application No. 201010290852.0.

(Continued)

*Primary Examiner* — Andrew Chriss
*Assistant Examiner* — Romani Ohri
(74) *Attorney, Agent, or Firm* — Staas & Halsey LLP (57) ABSTRACT

A method for realizing route discovery in a network includes: classifying a level of a node in the network; receiving a route request packet from a node adjacent to the node; comparing a node level indicated by node level information contained in the received route request packet with the level of the node; updating, in a case where the level of the node is higher than the node level indicated by the node level information contained in the route request packet, the node level indicated by the node level information contained in the route request packet to be the level of the node; and forwarding the updated route request packet to other nodes adjacent to the node.

8 Claims, 4 Drawing Sheets

(56) References Cited

OTHER PUBLICATIONS

Chinese Office Action issued Jul. 22, 2014 in corresponding Chinese Patent Application No. 201010290852.0.

Japanese Office Action dated Feb. 24, 2015 in corresponding Japanese Patent Application No. 2011-203267.

Lee et al., "Efficient Geographic Routing in Multihop Wireless Networks", MobiHoc '05, Illinois, USA, May 2005, pp. 230-241.

* cited by examiner

METHOD AND NODE FOR REALIZING ROUTE DISCOVERY IN NETWORK

CROSS REFERENCE TO RELATED APPLICATIONS

This application claims the benefit of Chinese Application No. 201010290852.0, filed Sep. 20, 2010, the disclosure of which is incorporated herein by reference.

FIELD

The present invention relates to the field of network communication, and in particular, to a method and node for realizing route discovery in a network.

BACKGROUND

There has been proposed several routing strategies such as Ad hoc On-Demand Distance Vector Routing (AODV), Dynamic Source Routing (DSR), Destination-Sequenced Distance-Vector Routing (DSDV) and the like for a wireless ad hoc network. Among them, the AODV protocol is the focus of research and is widely used. In the AODV, routing establishment and routing selection are two critical stages. At the stage of routing establishment, a source node transmits a route request (RREQ) packet to a destination node. The route request packet is a broadcasting packet which will be forwarded by intermediate nodes in a flooding manner. At the stage of routing selection, a route with a minimum hop count will be used as an effective path to the destination node from the source node. This routing method is very helpful to reduce routing control overhead and to improve efficiency. However, at the stage of routing establishment, a node forwards the RREQ packet transmitted by the source node in the flooding manner, which leads to following issues. Firstly, each node would forward the RREQ packet blindly (in the flooding manner), resulting in a large number of redundant information over the network. Secondly, the large number of RREQ packets transmitted by the nodes over the network would increase the probability of collision of the data packets. Thirdly, transmission and reception of the RREQ packets would occupy network resources, and therefore the transmission of the large number of redundant RREQ packets would result in reduction of the network performance.

SUMMARY

Hereinafter, there is provided a brief summary about the present invention in order to provide a basic understanding on certain aspects of the invention. However, it should be understood that this summary is not an exhaustive summary about the invention. It is not intended to determine critical portions or important portions of the invention, nor does it intend to limit the scope of the invention. The object thereof is only to propose some concepts with respect to the invention in a simplified form, thereby to be a prelude of the more detailed description given later.

In light of above situations in the prior art, an object of the invention is to provide a method and node for realizing route discovery in a network, which can reduce transmission of the RREQ packets efficiently, reduce the probability of collision of the data packets, and improve the network performance.

To achieve the above object, according to an aspect of the invention, there is provided a method for realizing route discovery in a network including the steps of: classifying a level of a node in the network; receiving a route request packet from a node adjacent to the node; comparing a node level indicated by node level information contained in the received route request packet with the level of the node; updating, in a case where the level of the node is higher than the node level indicated by the node level information contained in the route request packet, the node level indicated by the node level information contained in the route request packet to be the level of the node; and forwarding the updated route request packet to other nodes adjacent to the node.

According to another aspect of the invention, there is further provided a node for realizing route discovery in a network including: a level classification unit for classifying a level of the node; a reception unit for receiving a route request packet from a node adjacent to the node; a comparison unit for comparing a node level indicated by node level information contained in the route request packet received by the reception unit with the level of the node obtained by the level classification unit; a updating unit for updating, in a case where the level of the node is higher than the node level indicated by the node level information contained in the route request packet, the node level indicated by the node level information contained in the route request packet to be the level of the node; and a forwarding unit for forwarding the route request packet updated by the updating unit to other nodes adjacent to the node.

According to another aspect of the invention, there is further provided a computer program product for implementing the method for realizing route discovery in a network above.

According to another aspect of the invention, there is further provided a machine-readable storage medium on which computer program codes for implementing the method for realizing route discovery in a network above is carried.

In the technical solution of the invention mentioned above, a large number of redundant packets can be reduced when route discovery is performed, and potential collusion would be reduced since a large number of redundant information is removed. Thus, the technical solution of the invention can increase the packet transmission ratio and the network traffic and reduce the end to end delay.

BRIEF DESCRIPTION OF DRAWINGS

The invention can be better understood by referring to the detailed description given hereinafter in combination with the accompany drawings in which identical or similar components are denoted by identical or similar reference numbers. The accompany drawings together with the detailed description below are included in the specification and form parts of the specification for further illustrating preferred embodiments of the invention and explaining principles and advantages of the invention by way of example. Wherein.

Those skilled in the art should understand that elements in the drawings are only shown for the purpose of simplicity and clarity, and are not necessarily drawn to scales. For example, sizes of certain elements in the drawings may be enlarged relative to other elements so that it is helpful to improve the understanding on the embodiments of the invention.

DESCRIPTION OF EMBODIMENTS

Hereinafter, an exemplary embodiment of the invention will be described in combination with the drawings. For the purpose of clarity and simplicity, not all the features of the actual embodiment are described in the specification. However, it should be appreciated that it has to make a lot of decisions specific to the embodiments during a process for developing any such actual embodiments in order to achieve specific targets of developers, for example, complying with those restrictive conditions related to systems and operations, and these restrictive conditions may vary with different embodiments. Further, it should also be appreciated that although developing work may be very complex and time-consuming, such developing work is merely a routine task for those skilled in the art who benefit from the present disclosure.

Herein, there is still one point needed to be illustrated that, for preventing unnecessary details from obscuring the invention, only the device structures and/or processing steps closely related to the scheme according to the invention are shown in the drawings, and other details having little to do with the invention are omitted.

The method for realizing route discovery in a network according to the embodiment of the invention is described in detail with reference to the drawings in the following.

Figure 1:
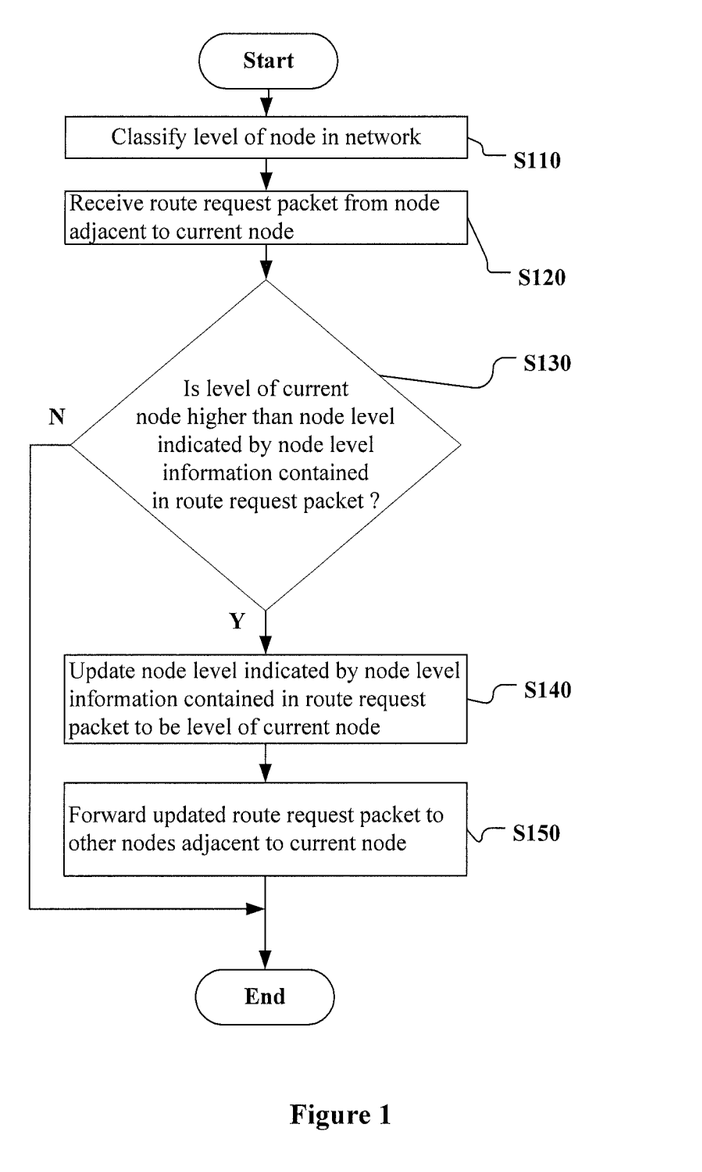
FIG. 1 is a flow chart illustrating a method for realizing route discovery in a network according to an embodiment of the invention.

FIG. 1 is a flow chart illustrating a method for realizing route discovery in a network according to an embodiment of the invention.

Firstly, in step S110, a level of a node in the network is classified.

Through the process in step S110, each of the nodes in the network is classified into various levels. It is appreciated by those skilled in the art that it is possible to classify the levels of the nodes in the network in a plurality of different manners as necessary.

According to the preferred embodiment of the invention, when the level of the node in the network is classified, cost of the node may be calculated firstly, and then the level of the node may be classified in accordance with the cost.

According to the preferred embodiment of the invention, the cost of the node may be calculated with following cost equation (1):

$$\text{cost} = a*\text{remaining\_energy} + b*\text{hop\_count} + c*\text{neighbor\_density} + d*\text{bandwidth} \quad (1)$$

where cost denotes the cost of the node, remaining_energy denotes remaining energy of the node, hop_count denotes a minimum hop count from the node to a destination node, neighbor_density denotes a neighboring node density of the node, bandwidth denotes bandwidth of the node, and a, b, c and d denote weighting coefficients.

It is appreciated by those skilled in the art that the weighting coefficients a, b, c and d mentioned above are decided in accordance with requirements of application scenarios. For example, if the weighting coefficient b of hop_count is set to be minimal, it means that the importance of hop_count in that application scenario is minimal. On the contrary, if the weighting coefficient b of hop_count is set to be maximal, it means that the importance of hop_count in that application scenario is maximal.

It is also appreciated by those skilled in the art that other parameters and corresponding weighting coefficients can be considered to be added into the cost equation in accordance with requirements of application scenarios, in addition to the parameters remaining_energy, hop_count, neighbor_density and bandwidth mentioned above.

According to the preferred embodiment of the invention, the cost of the node may be calculated at an initialization phase. At the initialization phase, for each of the nodes, after learning for a period of time, information on cost from the current node to the destination node can be obtained. Particularly, at the initialization phase, the node learns and collects the sample value of the cost from the current node to the destination node by transmitting a data packet to the destination node. Whereby, the level of the node can be classified according to the obtained cost of the node.

According to the preferred embodiment of the invention, the cost of the node may be updated in a process of data transmission. Particularly, at the data transmission phase, each time the node transmits or forwards the data packet, a current cost value will be calculated once from this process, and the calculated current cost value is added into a cost sample space of the node. Then, the cost of the node will be updated according to the cost sample space. Thus, the real time performance of the cost information can be improved, and the real time status change of the network can be adapted.

Next, in step S120, a route request (RREQ) packet from a node adjacent to the node is received.

The RREQ packet in the embodiment of the invention is different from that in the prior art in that node level information of the last hop node (i.e. the node transmitting this RREQ packet adjacent to the current node) is contained in the RREQ packet received by the current node.

Next, in step S130, a node level indicated by the node level information contained in the received route request packet is compared with the level of the current node. In other words, it is judged in step S130 whether the level of the current node is higher than that of the last hop node.

If it is judged in step S130 that the level of the current node is higher than that of the last hop node, the process proceeds to step S140.

If it is judged in step S130 that the level of the current node is not higher than that of the last hop node, the process ends.

According to the preferred embodiment of the invention, in a case where the level of the current node is not higher than the node level indicated by the node level information contained in the route request packet, the route request packet may be discarded instead of being forwarded.

If the process proceeds to step S140, the node level indicated by the node level information contained in the route request packet is updated to be the level of the current node in step S140.

Thus, the node level information indicating the level of the current node is contained in the updated route request packet.

Finally, in step S150, the updated route request packet is forwarded to other nodes adjacent to the current node.

With the method for realizing route discovery in a network above according to the invention, transmission of the RREQ packets can be reduced efficiently, the probability of collision of the data packets can be reduced, and the network performance can improved. The method according to the invention is particularly suitable for an intelligent meter reading system in an application scenario where network topology changes very slowly and the destination node has been determined.

According to the preferred embodiment of the invention, at the stage of routing establishment, before a source node starts to broadcast a route request packet to a node adjacent to the source node, information on a level of the source node is added as node level information into the route request packet.

After that, the source node broadcasts the amended route request packet to the node adjacent to the source node.

According to the preferred embodiment of the invention, after a destination node receives a route request packet from a node adjacent to the destination node, the route discovery is realized.

Hereinafter, the method for realizing route discovery in a network according to the invention is described in detail with reference to FIG. 2.

Figure 2:
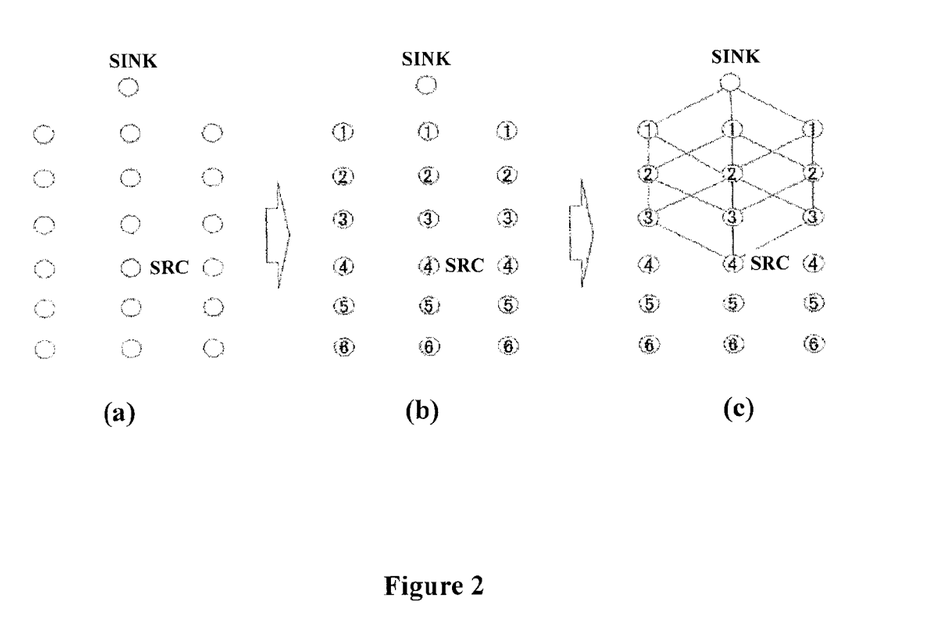
FIG. 2 is diagram illustrating a specific example of realizing of route discovery in a network according to the embodiment of the invention.

FIG. 2 is diagram illustrating a specific example of realizing of route discovery in a network according to the embodiment of the invention. In the network as shown in FIG. 2, a source node, an intermediate node and a destination node are included. Positions of the source node and the destination node are shown in FIG. 2(a).

Cost of a node is calculated at an initialization phase, and then a level of the node is classified in accordance with the calculated cost. For the purpose of convenience for explanation, only a minimum hop count from a current node to the destination node is taken into consideration when the cost of the node is calculated. That is, in the cost equation (1) above, the weighting coefficients a, c and d are set to be zero, and the weighting coefficient b is set to be 1. As shown in FIG. 2(b), the nodes in the network are classified into various levels. Herein, the level of the source node is Level 4. In the current example, higher the level number of a node is, lower the level of the node is.

At the stage of routing establishment, before the source node starts to broadcast a route request packet to a node adjacent to the source node, information on the level (Level 4) of the source node is added as node level information into the route request packet. After that, the source node broadcasts the amended route request packet to the node adjacent to the source node.

The intermediate nodes with Levels 3, 4 and 5, respectively, adjacent to the source node with Level 4 receive the route request packet from the source node. The node level information indicating the level (Level 4) of the source node is contained in the route request packets received by those intermediate nodes. Then, the intermediate node which receives the route request packet from the source node compares the node level indicated by the node level information contained in the received route request packet with the level of the current node, so as to judge whether the level of the current node is higher than that of the source node.

The intermediate node with Level 3 judges that the level of the current node is higher than that of the source node with Level 4, and then updates the node level (Level 4) indicated by the node level information contained in the route request packet to be the level (Level 3) of the current node.

Thus, the node level information indicating the level (level 3) of the current node is contained in the updated route request packet.

After that, the intermediate node with Level 3 forwards the updated route request packet to other nodes adjacent to this intermediate node.

Meanwhile, The intermediate node with Level 4 or 5 judges that the level of the current node is not higher than (lower than or equal to) that of the source node with Level 4, and then discards the route request packet instead of forwarding it.

Similarly, when a current node receives a route request packet from a last hop node, the current node firstly judges whether the level of the current node is higher than that of the last hop node. If the level of the current node is higher than that of the last hop node, the current node updates the level thereof into the route request packet and then forwards the updated route request packet to a next hop node. If the level of the current node is not higher than that of the last hop node, the route request packet is discarded instead of being forwarded.

At last, as shown in FIG. 2(c), when the destination node receives a route request packet from a node adjacent to the destination node, the route discovery from the source node to the destination node is realized.

The node for realizing route discovery in a network according to the embodiment of the invention is described in detail with reference to the drawings in the following.

Figure 3:
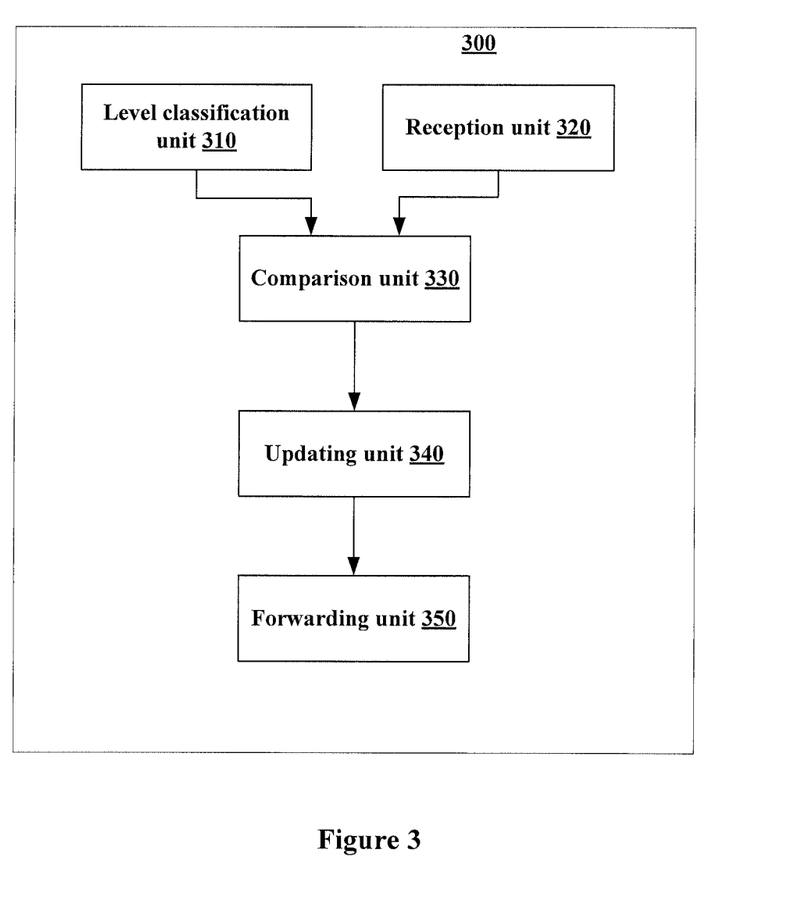
FIG. 3 is a block diagram illustrating a node for realizing route discovery in a network according to the embodiment of the invention.

FIG. 3 is a block diagram illustrating a node 300 for realizing route discovery in a network according to the embodiment of the invention.

As shown in FIG. 3, the node 300 according to the embodiment of the invention includes a level classification unit 310, a reception unit 320, a comparison unit 330, an updating unit 340, and a forwarding unit 350.

The level classification unit 310 is adapted to classify a level of the node 300.

The reception unit 320 is adapted to receive a route request packet from a node adjacent to the node 300.

The comparison unit 330 is adapted to compare a node level indicated by node level information contained in the route request packet received by the reception unit 320 with the level of the node 300 obtained by the level classification unit 310.

The updating unit 340 is adapted to update, in a case where the level of the node 300 is higher than the node level indicated by the node level information contained in the route request packet, the node level indicated by the node level information contained in the route request packet to be the level of the node 300.

The forwarding unit 350 is adapted to forward the route request packet updated by the updating unit 340 to other nodes adjacent to the node 300.

According to the preferred embodiment of the invention, the level classification unit 310 may further include a cost calculation unit (not shown) for calculating cost of the node 300. The level classification unit 310 classifies the level of the node 300 in accordance with the cost calculated by the cost calculation unit.

According to the preferred embodiment of the invention, the cost calculation unit may calculate the cost of the node 300 with the cost equation (1) above.

According to the preferred embodiment of the invention, the cost calculation unit may calculate the cost of the node 300 at an initialization phase.

According to the preferred embodiment of the invention, the cost calculation unit may update the cost of the node 300 in a process of data transmission by the node 300.

The various specific implementations of the respective units above in the node 300 have been described in detail previously, and therefore the explanations thereof will not be repeated herein.

Apparently, respective operating processes of the method above according to the invention can be implemented in a manner of a computer executable program stored on a machine-readable storage medium.

And, the object of the invention can be implemented in a manner that the storage medium on which the computer executable program above is carried is provided directly or indirectly to a system or apparatus, a computer or a Central Processing Unit (CPU) of which reads out and executes the computer executable program. Here, the implementation of the invention is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information. However, the machine-readable medium mentioned above does not include a transitory medium such as a propagation signal.

Additionally, the invention can also be implemented by connecting to a corresponding web site on the Internet through a computer, downloading and installing the computer executable program according to the invention into the computer, and then executing the program.

Figure 4:
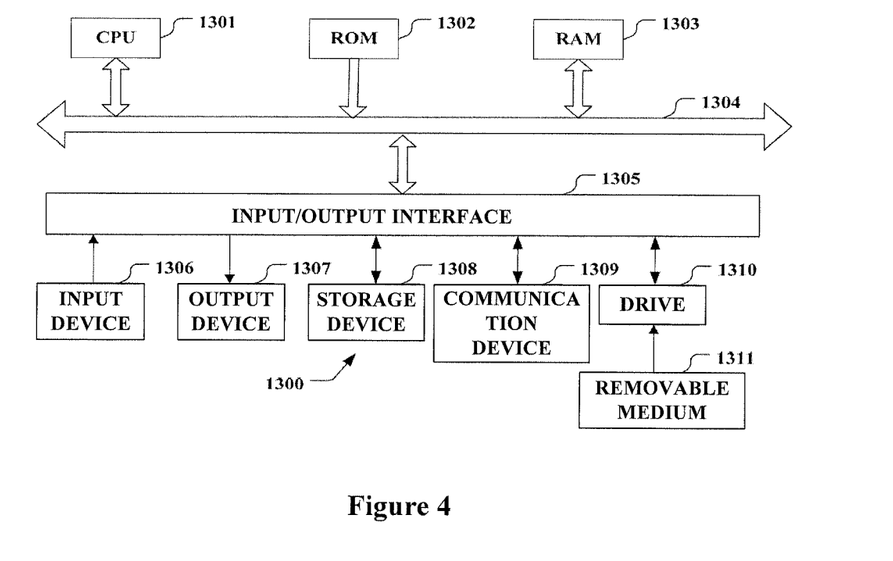
FIG. 4 is a block diagram illustrating an exemplary structure of a general purpose personal computer in which the method and/or node according to the embodiment of the invention can be implemented.

FIG. 4 is a block diagram illustrating an exemplary structure of a general purpose personal computer in which the method and/or node according to the embodiment of the invention can be implemented.

As shown in FIG. 4, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 can also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

In a case that the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 4 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

In the node and method of the invention, it is obvious that respective components or steps can be decomposed and/or recombined. Such decomposition and/or recombination should be considered as an equivalent solution of the invention. And, the steps performing a series of processing above can be performed in the describing order naturally, but this is not necessary. Some steps can be performed concurrently or independently with one another.

Although the embodiment of the invention has been described in detail in combination with the drawings above, it should be understood that, the embodiment described above is only used to explain the invention and is not constructed as the limitation to the invention. For those skilled in the art, various modification and alternation can be made to the above embodiment without departing from the essential and scope of the invention. Therefore, the scope of the invention is only defined by the appended claims and the equivalents thereof.

What is claimed is:

1. A method for realizing route discovery in a network comprising a plurality of nodes classified into a source node, an intermediate node, and a destination node, the method comprising:

classifying, by each of the plurality of nodes, a level of the each of the plurality of nodes in the network;

receiving, by the intermediate node, a route request packet from the source node or another intermediate node adjacent to the intermediate node;

comparing, by the intermediate node, a node level of the source node or another intermediate node indicated by node level information contained in the received route request packet with the level of the intermediate node;

updating, by the intermediate node, in a case where the level of the intermediate node is higher than the node level of the source node or another intermediate node, the node level indicated by the node level information contained in the route request packet to be the level of the intermediate node;

forwarding, by the intermediate node, the updated route request packet to the other intermediate node or the destination node adjacent to the intermediate node; and discarding, by the intermediate node, the route request packet in a case where the level of the intermediate node is not higher than the node level of the source node or another intermediate node, wherein classifying the level of the each of the plurality of nodes in the network further comprises: calculating cost of the each of the plurality of nodes; and classifying the level of the each of the plurality of nodes in accordance with the cost, and wherein the cost of the each of the plurality of nodes is calculated at an initialization phase, comprising: each of the plurality of nodes obtains the cost from the each of the plurality of nodes to the destination node by transmitting a data packet to the destination node, and wherein the cost of the each of the plurality of nodes is updated in a process of data transmission, comprising: a current cost value is calculated when the each of the plurality of nodes transmits or forwards the data packet, the calculated current cost value is added into a cost sample space of the each of the plurality of nodes, and the cost of the each of the plurality of nodes is updated according to the cost sample space.

2. The method according to claim 1, wherein the cost of the each of the plurality of nodes is calculated based on remaining energy, a neighboring node density, and bandwidth of the each of the plurality of nodes and a minimum hop count from the each of the plurality of nodes to the destination node.

3. The method according to claim 1, further comprising:
adding, by the source node, information on a level of the source node as node level information into the route request packet; and broadcasting the route request packet to the intermediate node or the destination node adjacent to the source node.

4. The method according to claim 1, further comprising:
realizing, by the destination node, the route discovery after a route request packet from the intermediate node or the source node adjacent to the destination node has been received.

5. A node for realizing route discovery in a network comprising a plurality of nodes classified into a source node, an intermediate node, and a destination node, the node when being classified into the intermediate node comprising:
 a level classification unit for classifying a level of the intermediate node;
 a reception unit for receiving a route request packet from the source node or another intermediate node adjacent to the intermediate node;
 a comparison unit for comparing a node level of the source node or another intermediate node indicated by node level information contained in the route request packet received by the reception unit with the level of the intermediate node obtained by the level classification unit;
 a updating unit for updating, in a case where the level of the intermediate node is higher than the node level of the source node or another intermediate node, the node level indicated by the node level information contained in the route request packet to be the level of the intermediate node; and
 a forwarding unit for forwarding the route request packet updated by the updating unit to the other intermediate node or the destination node adjacent to the intermediate node or discarding the route request packet in a case where the level of the intermediate node is not higher than the node level of the source node or another intermediate node,
 wherein the level classification unit further comprises: a cost calculation unit for calculating cost of the intermediate node;
 the level classification unit classifies the level of the intermediate node in accordance with the cost calculated by the cost calculation unit, and
 wherein the cost calculation unit calculates the cost of the intermediate node at an initialization phase, comprising: the intermediate node obtains the cost from the intermediate node to the destination node by transmitting a data packet to the destination node, and
 wherein the cost calculation unit updates the cost of the intermediate node in a process of data transmission by the intermediate node, comprising: a current cost value is calculated when the intermediate node transmits or forwards the data packet, the calculated current cost value is added into a cost sample space of the intermediate node, and the cost of the intermediate node is updated according to the cost sample space.

6. The node according to claim 5, wherein the cost calculation unit calculates the cost of the intermediate node based on remaining energy, a neighboring node density, and bandwidth of the intermediate node and a minimum hop count from the intermediate node to the destination node.

7. A machine-readable medium storing an information display program for causing a computer to execute a process for realizing route discovery in a network comprising a plurality of nodes classified into a source node, an intermediate node, and a destination node, the process comprising:
 classifying, by each of the plurality of nodes, a level of the each of the plurality of nodes in the network;
 receiving, by the intermediate node, a route request packet from the source node or another intermediate node adjacent to the intermediate node;
 comparing, by the intermediate node, a node level of the source node or another intermediate node indicated by node level information contained in the received route request packet with the level of the intermediate node;
 updating, by the intermediate node, in a case where the level of the intermediate node is higher than the node level of the source node or another intermediate node, the node level indicated by the node level information contained in the route request packet to be the level of the intermediate node;
 forwarding, by the intermediate node, the updated route request packet to the other intermediate node or the destination node adjacent to the intermediate node; and
 discarding, by the intermediate node, the route request packet in a case where the level of the intermediate node is not higher than the node level of the source node or another intermediate node,
 wherein classifying the level of the each of the plurality of nodes in the network further comprises: calculating cost of the each of the plurality of nodes; and classifying the level of the each of the plurality of nodes in accordance with the cost, and
 wherein the cost of the each of the plurality of nodes is calculated at an initialization phase, comprising: each of the plurality of nodes obtains the cost from the each of the plurality of nodes to the destination node by transmitting a data packet to the destination node, and
 wherein the cost of the each of the plurality of nodes is updated in a process of data transmission, comprising: a current cost value is calculated when the each of the plurality of nodes transmits or forwards the data packet, the calculated current cost value is added into a cost sample space of the each of the plurality of nodes, and the cost of the each of the plurality of nodes is updated according to the cost sample space.

8. The machine-readable medium according to claim 7, wherein the cost of the each of the plurality of nodes is calculated based on remaining energy, a neighboring node density, and bandwidth of the each of the plurality of nodes and a minimum hop count from the each of the plurality of nodes to the destination node.

* * * * *